United States Patent [19] [11] 3,729,654
Yeager [45] Apr. 24, 1973

[54] DIGITAL AUTOMATIC TRANSMITTER-RECEIVER TESTER

[75] Inventor: Dewey A. Yeager, Stillwater, Okla.

[73] Assignee: Quadall Company, Inc., Tonkawa, Okla.

[22] Filed: Aug. 2, 1971

[21] Appl. No.: 168,327

[52] U.S. Cl. ..................317/28 R, 317/29 R, 324/51
[51] Int. Cl. ..................H02h 3/30
[58] Field of Search ..................217/28 R, 27 R, 29 R; 324/51, 73

[56] References Cited

UNITED STATES PATENTS 3,414,773 12/1968 Knox ..................317/28 R

*Primary Examiner*—William M. Shoop, Jr.
*Assistant Examiner*—Harvey Fendelman
*Attorney*—Robert K. Rhea

[57] ABSTRACT

In a high voltage transmission line system having carrier-current directional relay means connected therewith terminal circuit means are connected with the carrier-current system at remote locations. The carrier-current testing means includes a master or control station and one or more slave terminal circuit means remote from the control station and responsive to the control station for indicating a fault in carrier-current system. The circuit of the control station is actuated at predetermined times and an alarm means is tripped in response to a transmission fault between any two carrier-current stations tested.

8 Claims, 12 Drawing Figures

Patented April 24, 1973 3,729,654

Patented April 24, 1973 3,729,654

DIGITAL AUTOMATIC TRANSMITTER-RECEIVER TESTER

BACKGROUND OF THE INVENTION

1. Field of the Invention

The present invention relates to high voltage transmission line protective systems and more particularly to a method and apparatus for automatically testing current actuated directional relay systems.

One method of protection or testing of high voltage transmission line network has been the sending of signals from one station to another along the line requiring the presence of an operator at each of the stations to log the results received at the respective station. It is, therefore, desirable that a means be provided for automatically testing carrier-current actuated relay systems at predetermined times so that in the event of a fault in the system a warning may be indicated to the operator on duty in a central or master control station. Further, it is desirable that some indication or type of fault be indicated, such as a fault in full power transmission indicating a major fault or a minor problem, such as detected in a reduced power transmission.

2. Description of the prior art.

The prior art discloses a plurality of circuit means and methods for testing high voltage transmission lines which generally accomplish the desired function but have the disadvantage of or lack of exact co-ordination or timing between the master or control station and remote stations.

The most pertinent prior patent being U.S. Pat. No. 3,414,773 which discloses circuitry for testing multiple terminal points connected with a transmission line system. The various terminals or stations isclosed by this patent include a switching contact means energized by a synchronous motor in each terminal or station. The principal disadvantage of this disclosure being the time required for the synchronous motor to rotate the contacts through their programed sequence and a further disadvantage that the driving motor of each respective testing terminal or station located remote from each other, discontinuing its operation before a complete cycle of operation at the remote stations. Stated another way, the motor in a remote station is not always stopped, with respect to its contacts, at the exact position of the motor in the master or control station, therefore, resulting in a malfunction or false alarm at the subsequent predetermined automatic testing periods.

This invention overcomes the above disadvantages by providing a complete cycle of carrier equipment testing functions in relatively less time, comprising only a few seconds and further insures that stations remote from the control station, after an alarm signal or interruption of operation are energized through a complete cycle so that the remote station or stations are automatically repositioned to a "starting" position each time a testing cycle is initiated by the control station.

SUMMARY OF THE INVENTION

The testing apparatus or system comprises a plurality of basic switching means or circuits installed at selected locations or terminal points of a high voltage transmission network. Each switching means being periodically actuated to test the carrier-current system by a timer in a control station. At each terminal point of two or three terminals of transmission line substations, one of the programed switching means is installed to control full power transmission, reduced power reception and the like, of the respective carrier equipment. One of the switching means is maintained as a control or actuating terminal A while the remaining terminal stations, designated by other letters, such as B, C and D, comprise cooperating switching means which are responsive to the control station and to each other in turn and their operations are synchronized.

Each of the switching means basically comprise a stepping relay connected with a source of direct current which, when actuated, by the timer in the control station, open and close relay and time delay contacts forming a part of the circuit of each switching means which are responsive to each other and to a malfunction or fault in the carrier-current system. When initially actuated, the stepping relay in the master control station A energizes a first contact which must be duplicated, in turn, in each remote station or stations before the stepping relay closes a subsequent programed contact in response to a signal received from the remote station or stations. In the event such a signal is not received upon closing, by failure of a slave station contact to close, in any portion of the circuitry in any one of the stations an alarm is energized in the control station thus indicating a fault in the carrier-current system. In the event no fault is detected by any one of the plurality of switching means, in a like number of terminals or stations, each complete their programed cycle of operation in conjunction with each other and return to an initial starting position with the cycle of operation registered by an indicator in the master station to establish a record of the completion of a testing cycle.

The principal object of this invention is to provide an automatic relay carrier tester capable of testing two or three terminal carrier relay systems at predetermined times wherein remotely located testing means is capable of sending and receiving full and reduced power and which individually actuate carrier reception failures by an alarm located in the master testing means.

DESCRIPTION OF THE PREFERRED EMBODIMENTS

Figures 1, 2:
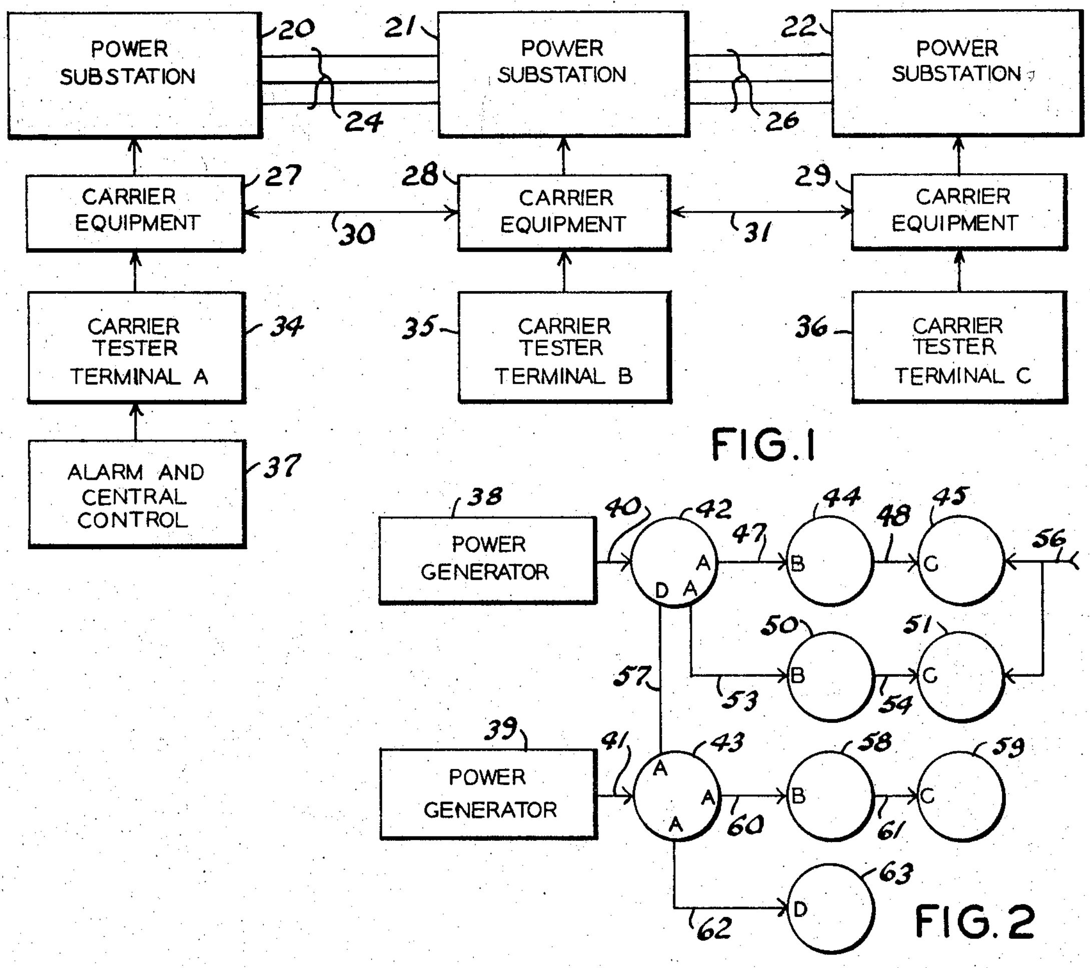
FIG. 1 is a block diagram of a three-terminal transmission linkage equipped with carrier-current means and testing terminals.
FIG. 2 is a diagram illustrating various two and three terminal power distribution arrangements.

Like characters of reference designate like parts in those figures of the drawings in which they occur.

In the drawings:

FIG. 1 illustrates a three-terminal line comprising spaced power substations 20, 21 and 22, interlinked by three-wire high voltage distribution lines 24 and 26. This is a conventional form of power distribution, which in some cases may include only two-wire lines. The power substations are conventionally provided with an overload protective relay equipment means designated as carrier equipment 27, 28 and 29 serially interconnected, respectively, by lines 30 and 31, to provide relay of faults of the particularly protected section of power transmission. The carrier equipment 27, 28 and 29 is normally used to send and receive other data, such as telephony, supervisor signals or other information relating to the maintenance of power transmission lines.

The above described equipment is substantially conventional with which the instant invention is intended to be used comprising the automatic carrier testers 34, 35 and 36, each connected to the respective carrier equipment 27, 28 and 29. The carrier testers 34, 35 and 36 are also designated as terminals A, B and C, respectively. Terminal A being the master or control terminal with terminals B and C acting as slave terminals to terminal A. The master terminal A also includes an alarm and serves as a central control 37 of supervised stations. One feature of this invention is that while the transmission system illustrated in FIG. 1 includes a three-terminal power transmission system, a two-terminal distribution network may be formed using the master terminal A and an end terminal D as explained hereinbelow.

FIG. 2 is an example of power distribution arrangement illustrating a plurality of power distribution stations and associated protective relay systems. A pair of power generators 38 and 39 serve as primary sources of distribution on lines 40 and 41 to respective substations 42 and 43. Power may be distributed along a first three-terminal network including the substations 44 and 45 serially interconnected by distribution lines 47 and 48. Carrier tester equipment terminals A, B and C being shown by the respective letter designations. Similarly substation 42, provided with a master terminal A, may be extended throughout substations 50 and 51 by distribution lines 53 and 54. The terminal C substation 51 may in turn receive power from another source on line 56 wherein other distribution and protective networks may be connected. The substation 43 may supply power by the line 57 to the substation 42. The overload protection means for this two-terminal network may comprise a master terminal A as designated at substation 43 and D at substation 42. Substation 43 may also have another local distribution of the three-terminal type comprising outlying substations 58 and 59 serially interconnected by lines 60 and 61. This three-terminal network is provided with a master terminal A, and slave terminals B and C. Further, a two-terminal distribution network is shown from a terminal A position in substation 43 via the transmission line 62 to a terminal D of a substation 63.

It should be noted that in a three-terminal network terminals A, B and C are used together with terminal C being the remote end of the network. However, if only two terminals are to be used it consists of a terminal A and an end terminal D.

With reference to FIG. 1, the carrier equipment 27, 28 and 29, connected in a three-terminal array to power substations 20, 21 and 22, respectively, serve to employ their carrier-current signals in preventing operation of protective circuit breakers within the terminal network when faults occur outside of the protected area. During short circuit conditions or faults, in the power system within the three-terminal network, the direction of flow of fault current may be checked by directional relays at the respective end of the protected line section and the carrier equipment may function accordingly. If the fault current direction is into one end of the terminal network as into terminal A and out at the other or end terminal C or D, if used, the fault will be detected as lying beyond the terminal protected section and the carrier current equipment is used to energize blocking signals from the end terminal station to the terminal A substation to prevent tripping of protective relays. In the event the fault is determined to be internal, that is between terminal A and an end terminal C or D, the respective carrier equipment transmitters will be turned off thus permitting the protective relays to trip.

The carrier testers of this invention include programed switch units connected with the respective carrier equipment at the selected power substation and provide automatic periodical testing of the carrier power equipment to maintain the latter operative at all times. The particular location of the master terminal A is a matter of choice depending upon the desired installation.

Figures 3, 7:
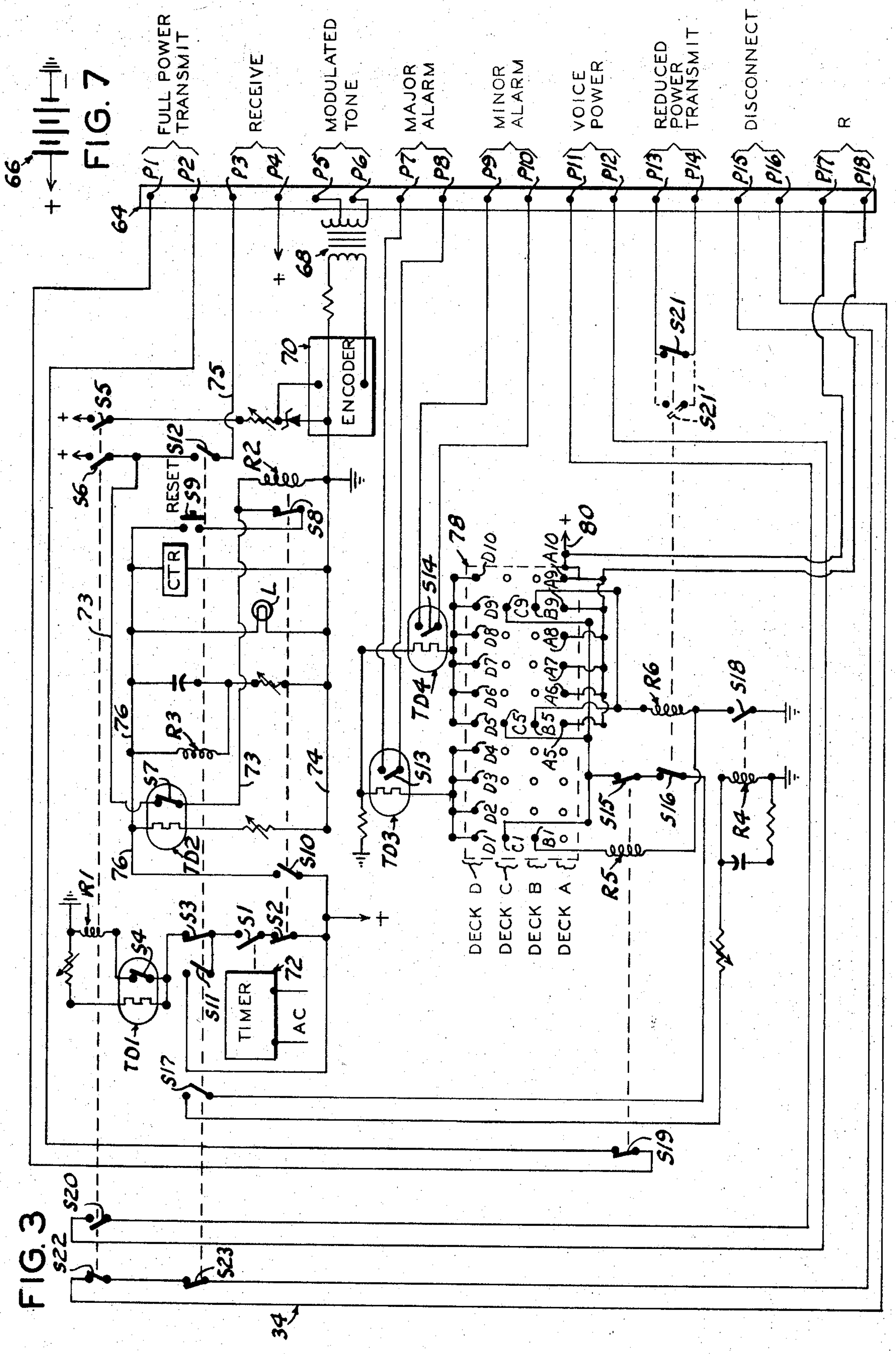
FIG. 3 is a wiring diagram of a master or terminal A carrier tester.
FIG. 7 illustrates a typical direct current power supply for energizing the respective tester circuits.

Referring now more particularly to FIG. 3, one form of terminal A, relay carrier tester 34, is shown in schematic form. The other terminal tester B, C and D are slightly different as is explained thereinbelow.

Terminal A, tester 34, includes a junction block or strip 64 provided with a plurality of posts or pins designated P1 through P18. The strip 64 carries all external connections for the respective terminals including a "power-in" terminal pin P4 to supply direct current from a battery 66 (FIG. 7) having its positive lead connected with the respective terminals or contacts indicated in the diagrams by the arrows and grounded to a common ground. Certain pins of the junction strip 64 are also connected to the carrier equipment means as explained hereinbelow.

A conventional timer 72 is connected with a suitable source of alternating current AC. A transformer 68 has the ends of its primary winding connected with an encoder 70. The encoder 70 is conventional and may be obtained from Meson Electronics Co. Rochester, N.Y. No. PCM 0124R. The leads of the secondary winding of transformer 68 are connected with the pins P5 and P6 with the pin P5 center tapped to the secondary winding. The timer 72, actuated at a predetermined time, closes a normally open switch S1 to energize a relay R1 connected with the battery 66 through normally closed switches S2, S3 and S4. The switch S4 forms a part of a time delay relay TD1 having its resistance connected in parallel with the switch S4 and relay R1 through a suitable variable resistance for controlling the time relay R1 is energized. Relay R1, when energized, closes a normally open switch S5 connected to the battery and to the encoder 70 through a variable resistor and diode thus energizing the encoder. Energizing the encoder transmits a signal to the terminals B, C or D as hereinafter explained.

Relay R1 also closes a normally open battery connected switch S6 which is connected with one end of the coil of a stepping relay R2 by a wire 73 through a normally closed switch S7 forming a part of a time delay relay TD2. The other end of the coil of relay R2 is grounded. One terminal of the time delay relay TD2 is connected to the encoder 70 and grounded by a wire 74. The other terminal of time delay TD2 is connected to a wire 76 in turn connected, at one end, with the wire 73 adjacent the coil of relay R2 through a normally closed switch S8 and a normally open reset button or switch S9. The other end of the wire 76 is connected through a normally open switch S10 to the switch S2 and to one terminal of the switch S3 through a normally open switch S11. When relay R2 is energized and closes switch S10 a relay R3, connected to the wire 76 and wire 74 in series with a variable resistor and in parallel with a condenser, is energized. Energized relay R2 opens switches S2 and S8 thus interrupting current through the timer controlled switch S1 while relay R3 closes a normally open switch S12 connected to the wire 73 and the strip pin P3 by a wire 75. The circuit of terminal A is now in condition for a signal reception through terminal connected strip pins P3 and P4.

An indicator lamp L and testing register or counting indicator CTR are connected in parallel across the wires 74 and 76. The counter CTR is a conventional direct current actuated instrument. The stepping relay R2 includes a bank of contacts, diagrammatically enclosed by the shield lines 78, with its contacts diagrammatically arranged in horizontal and vertical rows with the respective horizontal rows of ten contacts designated as deck A, deck B, deck C and deck D, respectively, with the respective numbered contacts used preceeded by the deck letter designation. The wiper arm 80 of relay R2 is connected with the battery 66. Relay R2 contacts D1, D2, D3 and D4 are connected together and to one terminal of the resistance of a time delay TD3. Relay R2 contacts D1, D2, D3 and D4 are used as full power testing of the carrier-current system. Relay R2 contacts D5, D6, D7, D8, D9 and D10 are connected together and to one terminal of the resistance of a time delay TD4. The other terminals of time delays TD3 and TD4 are connected to ground. Relay R2 contacts D5, D6, D7, D8, D9 and D10 are used with reduced power to further test the carrier equipment.

Major alarm strip pins P7 and P8 are connected by a pair of wires to the respective contacts of a switch S13 forming a part of time delay TD3. Similarly minor alarm strip pins P9 and P10 are connected by a pair of wires to the contacts of a switch S14 forming a part of time delay TD4. Relay R2 contacts C1, C5 and C9 are connected together and through a pair of normally closed series connected switches S15 and S16 in turn connected to one end of the coil of a relay R4 through a normally open switch S17 and variable resistor. The other end of the coil of relay R4 is connected to ground. A suitable condenser and resistor are connected in series across the coil of relay R4. Normally open switch S17 is closed by relay R3 when energized. Relay R2 contact B1 is connected to one end of the coil of a relay R5 with its other end connected to one end of the coil of a relay R6 and to ground through a relay R4 closed normally open switch S18. Relay R2 contacts B5 and B9 are connected together and to the other end of the coil of relay R6. Relay R2 contacts A5, A6, A7, A8, A9 and A10 are connected together and to a wire connected to the reduced power receive strip pin P18 while the reduced power receive strip pin P17 is connected by a wire to the relay wiper arm 80. Reduced power transmit test may be accomplished by reducing the power of the carrier transmitter for reception by the terminals at strip pins P3 and P4 or as an alternative, according to the type and make of carrier equipment components used, the strip pins P17 and P18 may be bridged by a resistance, not shown, and used in receiving reduced power. Full power transmit strip pins P1 and P2 are connected by a pair of wires to the respective ends of a normally closed switch S19 controlled by relay R5. Voice power strip pins P11 and P12 are connected by a pair of wires to the contacts of a normally open relay R1 closed, switch S20. Reduced power strip pins P13 and P14 are connected by a pair of wires to a relay R6 controlled, normally closed, switch S21 or normally open switch S21'.

Circuit disconnect or disabling strip pins P15 and P16 are connected by a pair of wires through a pair of series connected, normally closed, switches S22 and S23, respectively, opened by relays R1 and R3.

Figure 4:
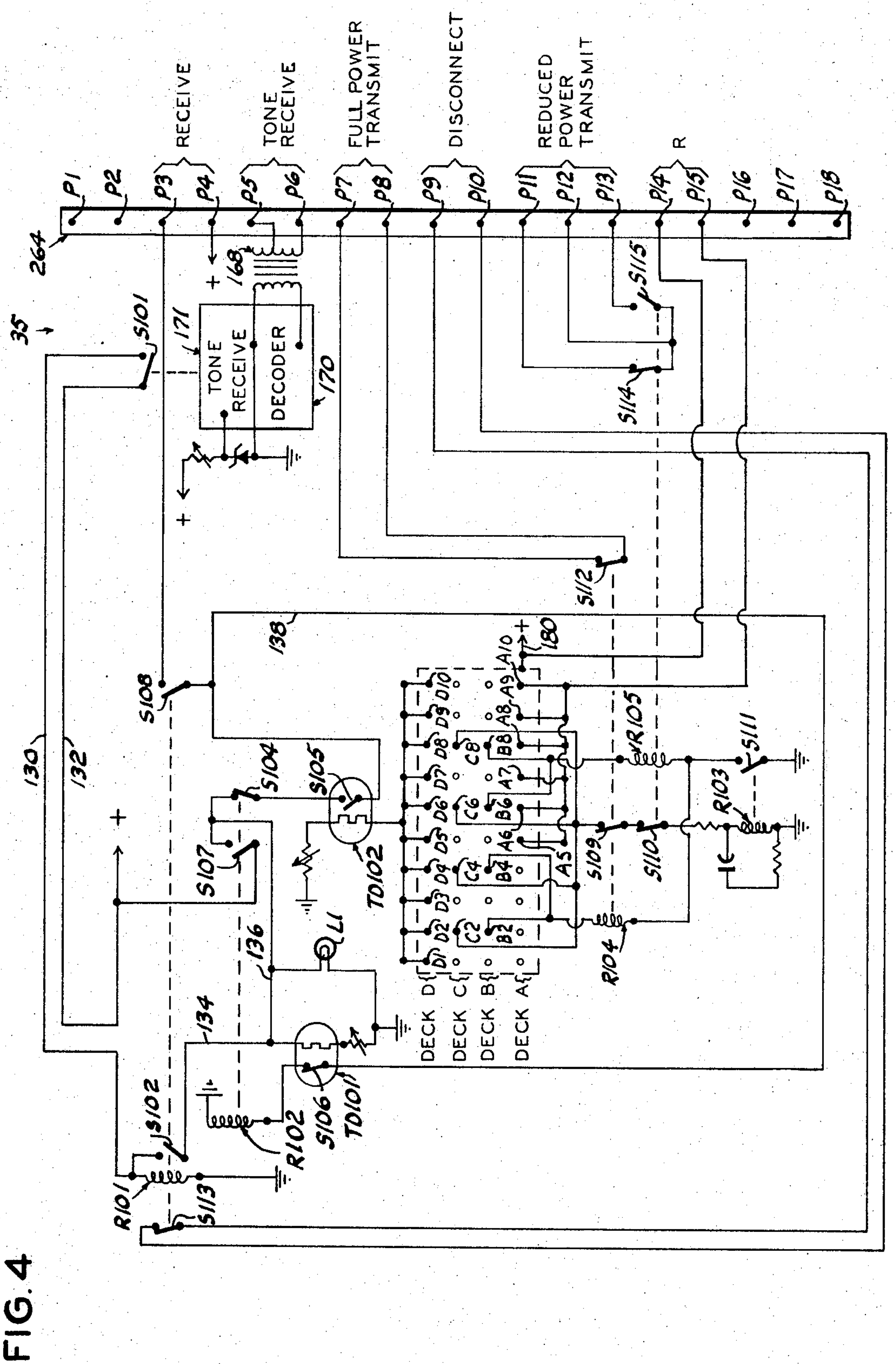
FIGS. 4, 5 and 6 are similar wiring diagrams, respectively, illustrating carrier tester terminals B, C and D interconnected with each other and the master terminal A.

Referring also to FIG. 4, the circuit of carrier tester station 35 or terminal B employs similar components and identical similarly numbered and lettered pins of a junction strip 164. The end of the primary winding of a transformer 168 is connected to a conventional decoder 170 and a tone receiver 171. The decoder 170 and tone receiver 171 are conventional and similarly may be obtained from Meson Electronics Co., Rochester, N.Y. One end of the secondary winding of the transformer 168 is connected to the strip pin P6 with pin P5 center tapped. The interconnected tone receiver and decoder is connected with the source of direct current through a series connected diode and variable resistor. Thus, the pins P5 and P6 conduct audio or tone to the decoder 170 and tone receiver 171 from terminal A.

A relay, not shown, in the tone receiver 171 closes a normally open switch S101 having its terminals connected with a pair of wires 130 and 132. The other end of the wire 130 is connected with a relay R101 in turn connected to ground. A normally open, relay R101 closed, switch S102 and has one of its contacts connected with the wire 130 and its other contact connected in series by a wire 134 with the resistance element of a time delay TD101 with the other terminal of this time delay resistance element connected to ground through a variable resistor. A wire 136, connected with the wire 134 is connected to a normally closed switch S104 connected in series with a time delay switch S105 in turn connected to the coil of a similar stepping relay R102, by a wire 131, through a normally closed switch S106 of time delay TD101. The other end of the coil of relay R102 is connected to ground and is thus energized when relay R101 closes switch S102. The stepping relay R102 is identical with respect to the above described relay R2 containing an identical number and lettered plurality of decks of contacts and wiper arm connected with the source of direct current. The wire 132 is also connected with the source of current and to one end of the wire 136 through a normally open, relay R102 closed, switch S107. When relay R101 is energized, it closes a normally open switch S108 connected in series between the wire 138 and strip pin P3 which energizes stepping relay R102.

A lamp L1 is connected to ground and the wire 136 in parallel with the time delay TD101.

Relay R102 contacts D1 through D10 are connected together and to the resistance element of a time delay TD102, containing the switch S105, and in turn connected to ground through a variable resistor. Relay R102 contacts C2, C4, C6 and C8 are connected together and through a pair of series connected, normally closed, switches S109 and S110 in turn connected with one of the grounded coil of relay R103. Relay R102 contacts B2 and B4 are connected together and to one end of the coil of a relay R104 connected at its other end to ground through a normally open, relay R103 closed switch S111. Relay R102 contacts B6 and B8 are connected together and to one end of the coil of a relay R105 in turn connected to ground through the switch S111. Relay R102 contacts A5 through A10 are connected together and to the strip pin P15. The strip pin P14 is connected to the wiper arm 180 of the relay R102. The full power transmit pins P7 and P8 are connected in series through the contacts of a normally closed switch S112 opened by the relay R104.

The disable or disconnect strip pins P9 and P10 are connected in series by a pair of wires through a normally closed, relay R101 opened, switch S113. The reduced power transmit pins P11 and P12 are connected in series through a normally closed, relay R105 opened, switch S114 while the strip pin P13 is connected with the strip pin P12 through a normally open, relay R105 closed, switch S115.

Figure 5:
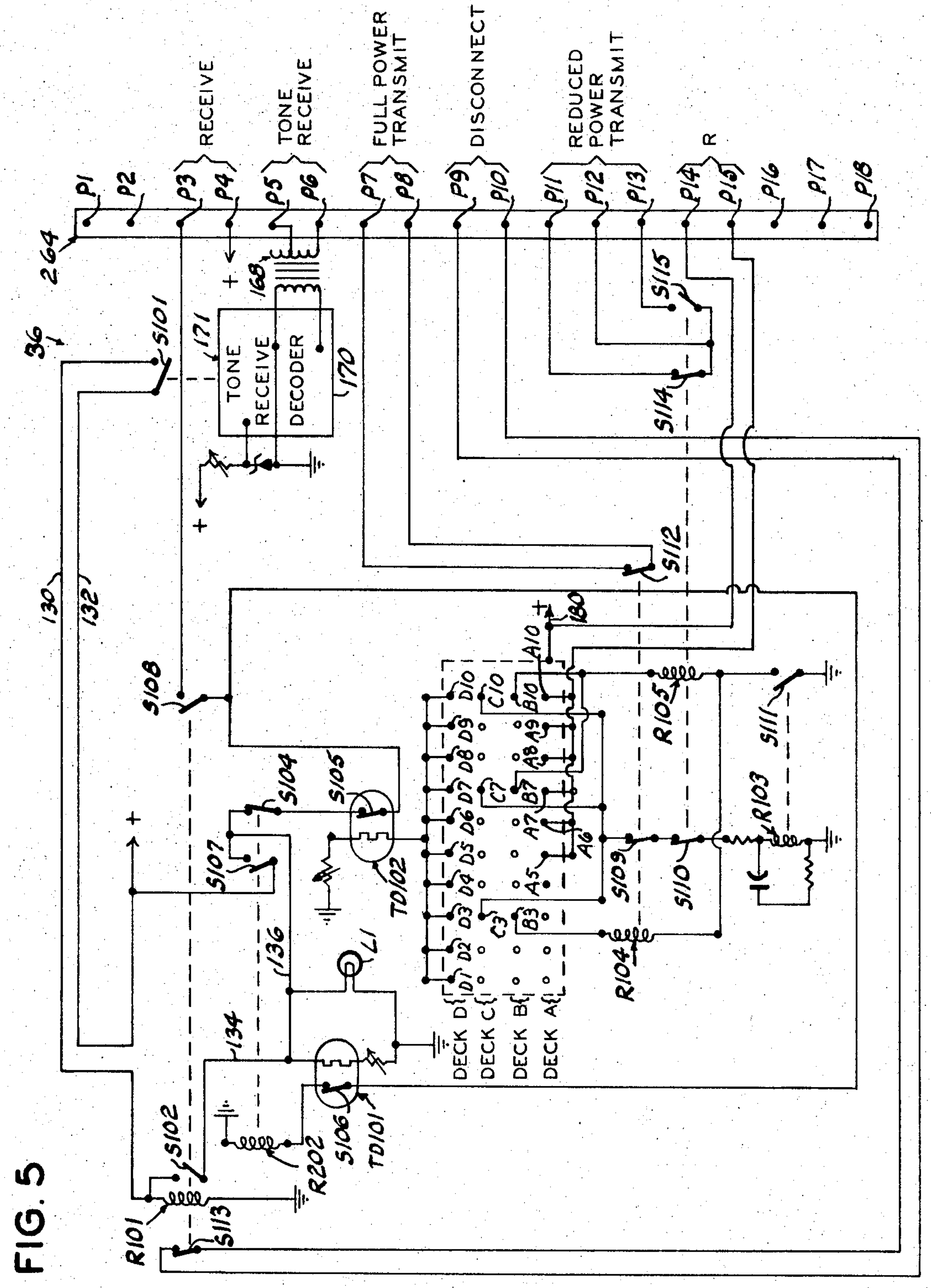

Referring now to FIG. 5, the circuit of carrier tester station 36 or terminal C is identical with respect to the circuit of terminal B circuit 35 using identically numbered and lettered components with the exception of the connection of certain contacts of decks B and C of stepping relay R202. Relay R202 is identical with respect to the stepping relay R2 of terminal A (FIG. 3). Relay R202 contacts C3, C7 and C10 are connected together and to the series connected switches S109 and S110 in turn connected to the relay R103. Relay R202 contacts B3, B7 and B10 are connected together and to the coil of relay R105.

Figure 6:
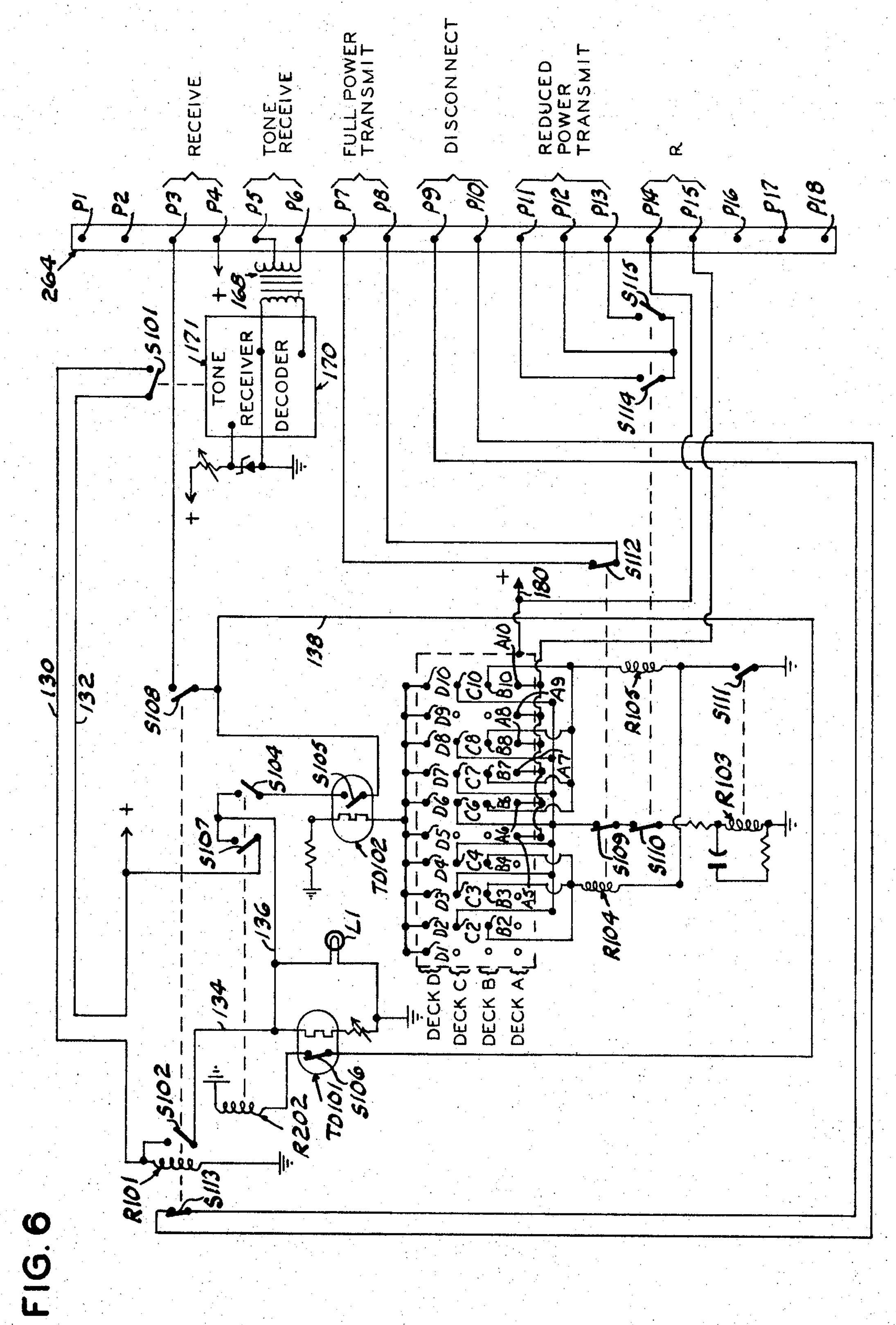

Referring now to FIG. 6, the circuit of carrier tester station terminal D is identical with respect to the circuits of terminals B and C, 35 and 36, respectively, using identically numbered and lettered components with the exception of the connection of certain contacts of decks B and C of stepping relay R202. Relay R202 contacts C2, C3, C4, C6, C7, C8 and C10 are connected together and to the series connected switches S109 and S110 in turn connected to the relay R103. Relay R202 contacts B2, B3, B4, B7, B8 and B10 are connected together and to the coil of relay R105.

Figure 8:
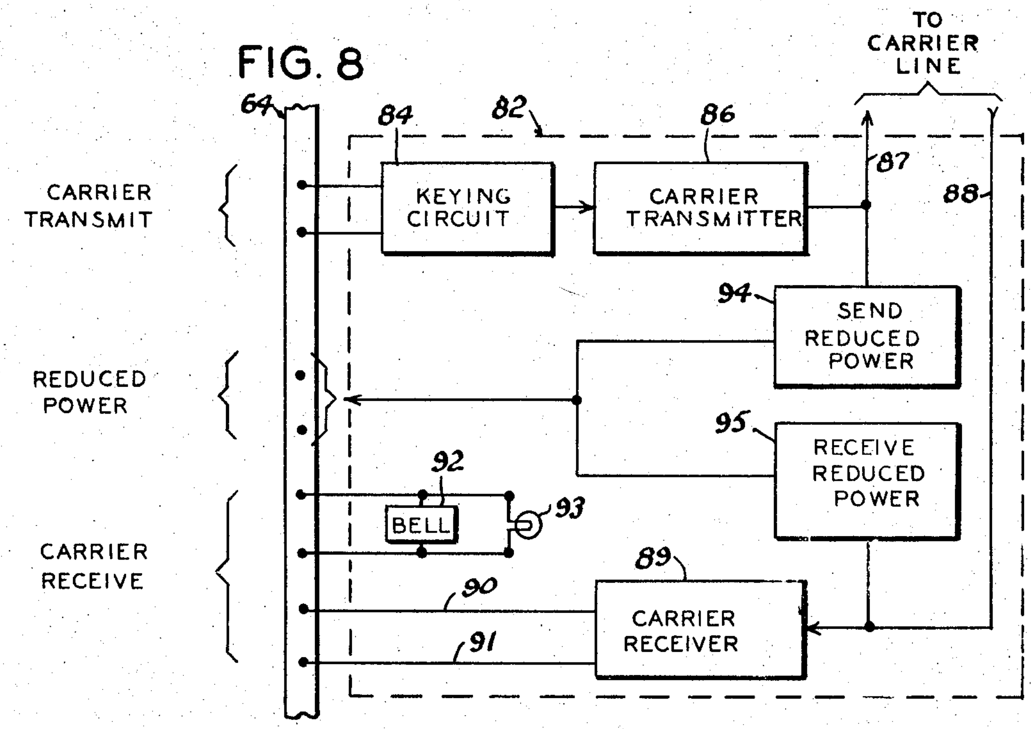
FIG. 8 is a block diagram of typical interconnecting equipment with which the terminal circuits may be employed.

FIG. 8 illustrates the manner in which an automatic carrier tester circuit, such as illustrated in FIG. 3, may be connected to typical commercially available protection type carrier equipment 82. The diagram of FIG. 8 is illustrative of the connection by any of the terminal A, terminal B or terminal C circuits. The carrier equipment 82, preferably includes a conventional keying circuit 84 for controlling the carrier transmitter 86 by connection to the carry "send" terminals of the junction strip 64. When keyed, the carrier transmitter 86 provides carrier output on the line 87 of a conventional carrier voltage of predetermined frequency. Carrier control currents can also be received on the line 88 to the input of the carrier receiver 89. Carrier receiver output voltage is then present between leads 90 and 91 to carrier receive terminals of the junction strip 64.

A bell 92 and/or a warning lamp 93 are connected to the terminal post at carrier receive locations for energizing upon receipt of carrier power fault indication in the carrier current system supplied by one or more of the terminals circuits A, B or C.

As mentioned hereinabove it is desired to employ reduced power testing sensing for minor line faults, such as ice on the line. The reduced power sensitivity can be normally obtained by reducing the transmitter output or individual calibrations of the carrier test equipment to obtain the desired results.

As illustrated in FIG. 8, both a send reduced power unit 94 and a receive reduced power unit 95 are included and connected to the respective send and carrier receive lines 87 and 88. FIGS. 9, 10, 11 and 12 illustrate another embodiment of the testing circuits which perform the testing function in less time than the circuits of FIGS. 3, 4, 5 and 6, and generally requires less maintenance.

Figure 9:
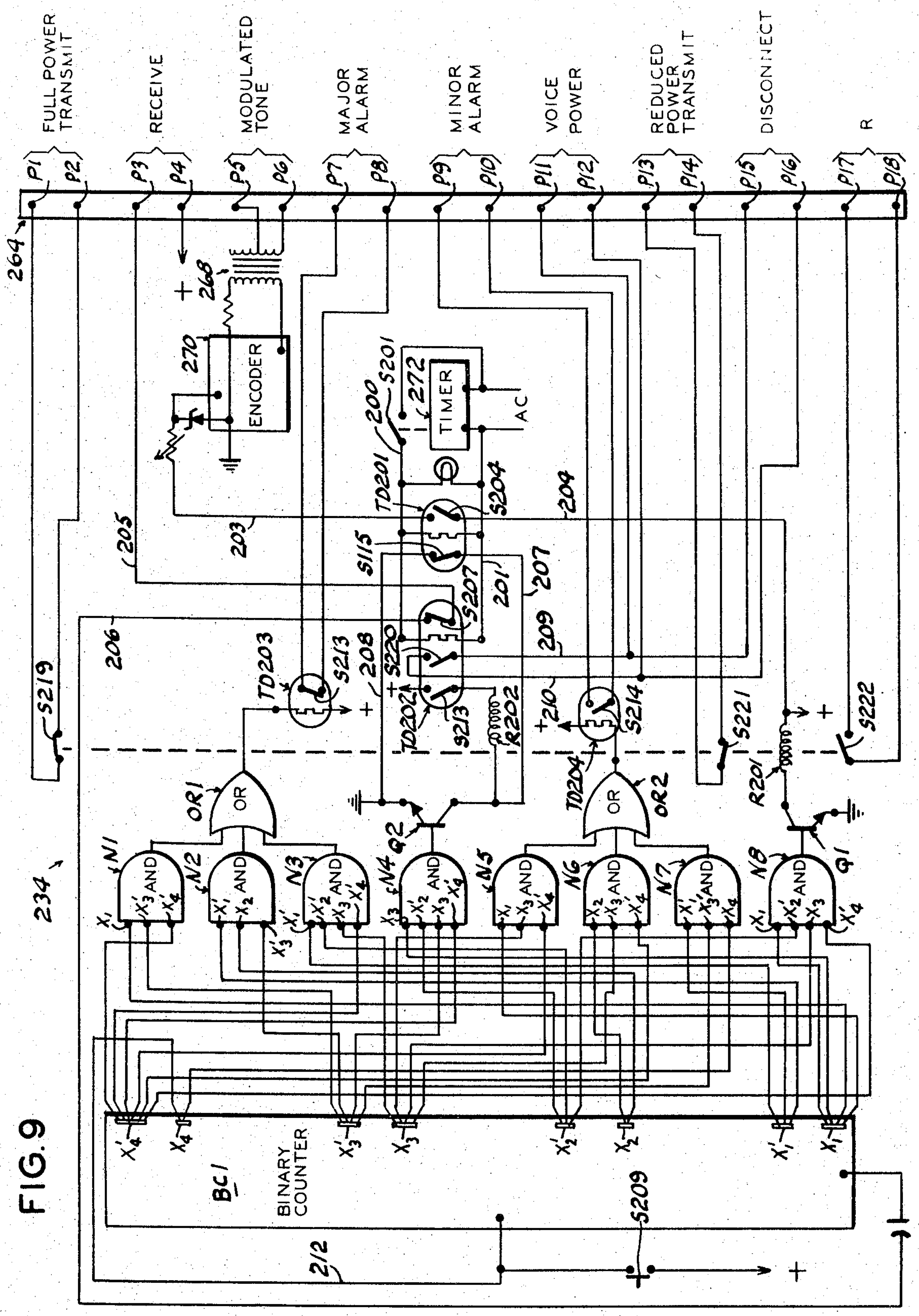
FIG. 9 is a wiring diagram of an alternative digital testing circuit for a master terminal A'; and, FIGS. 10, 11 and 12 are similar wiring diagrams, respectively, illustrating carrier tester circuits for respective terminals B′, C′ and D′ which are interconnected with each other and the master digital terminal A′.

Referring more particularly to FIG. 9, a master or terminal A' solid state circuit is indicated generally at 234 which employes a similar junction strip 264 having identically numbered posts or pins P1 through P18. This embodiment similarly uses a battery, such as the battery of FIG. 7, as a source of energy and employes a binary counter BC1 in place of the stepping relay used in FIG. 3. The binary counter BC1 is conventional and may be obtained from Texas Instruments, Inc., Dallas, Tex., numbered SN15845N. This counter is provided with a plurality of terminal posts, eight in the example shown, and numbered $X_1$; $X_1'$; $X_2$, $X_2'$; $X_3$; $X_3'$; $X_4$; and $X_4'$. A plurality of AND gates numbered N1, N2, N3, N4, N5, N6, N7 and N8, each having contacts as indicated, with the respective contact connected by wiring to the respective indicated terminal posts of the counter BC1. These AND gates are conventional and may be obtained from Texas Instruments, Inc., Dallas, Tex. AND gates N1, N2, N5, N6 and N7 are identical and are marketed under Ser. No. SN4H11N while AND gates N3, N4 and N8 are marketed under Ser. No. SN74H21The output of AND gates N1, N2 and N3 are connected to the input of an OR gate OR1. The output of the Or gate OR1 is connected to one end of the resistance element of a time delay TD203 with the time delay in turn connected to the source of direct current.

An identical OR gate OR2, having its input connected with the outputs of AND gates N5, N6 and N7, has its output connected to the resistance element of a time delay TD204 in turn connected with the source of direct current.

A timer 272, connected with a source of electrical energy AC, at a predetermined time, closes a switch S201 interposed in a wire 200 connected with one wire of the current source AC. A second wire 201 is connected with the other AC source wire. A time delay TD201 is connected across the current source wires 200 and 201. Similarly, an encoder 270 is connected to the primary winding of a transformer 268 with the secondary winding of the transformer having one end connected to the strip pin P6 and this winding center tapped and connected to the strip pin P5. The output of the encoder is connected through a diode and suitable resistor to one terminal of a switch S204 operated by the time delay TD201 by a wire 203. Another wire 204 connects the other terminal of the switch S204 to one end of the coil of a relay R201 with the other end of the relay coil connected to the collector of a transistor Q1. The base of the transistor Q1 is connected to the AND gate N8 while its emitter is connected to ground. The strip pin P4 is connected to the positive terminal of the direct current source. Strip pin P3 is connected by a wire 205 to one terminal of a switch S207 forming a part of a time delay TD202 connected in parallel with the time delay TD201 across the AC source wires 200 and 201. Another wire 206, connected with the other terminal of the switch S207, is connected to the binary counter through a suitable condenser.

The AND gate N4 has its output connected to the base of a second transistor Q2. The collector of the transistor Q2 is connected to one end of the coil of a relay R202 with the other end of the relay coil connected with one terminal of a switch S213 with the other terminal of the switch S213 connected with the source of direct current. The collector of the transistor Q2 is also connected with its grounded emitter by wires 207 and 208 through a switch S215 controlled by the time delay TD201. The reset terminal of the binary counter BC1 is connected to its terminal post $X_4$ by a wire 212. The wire 212 is connected to the direct current source through a normally open "reset" switch S209.

Full power transmit strip pins P1 and P2 are connected by a pair of wires to a switch S219 controlled by relay R201. Major alarm strip pins P7 and P8 are connected by a pair of wires through a switch S213 controlled by the time delay TD203. Minor alarm strip pins P9 and P10 are connected through a switch S214 controlled by the time delay TD204. Voice power strip pins P11 and P12 are connected by a pair of wires 209 and 210 to a switch S220 controlled by the time delay TD202. Reduced power transmit strip pins P13 and P14 are connected together by a pair of wires through a switch S221 controlled by relay R201. Disconnect strip pins P15 and P16 are connected by a pair of wires to the wires 209 and 210, respectively, and operated by the time delay TD202 switch S220. Reduced power receive strip pins P17 and P18 are connected together by a pair of wires through a switch S222 controlled by the relay R201.

Figure 10:
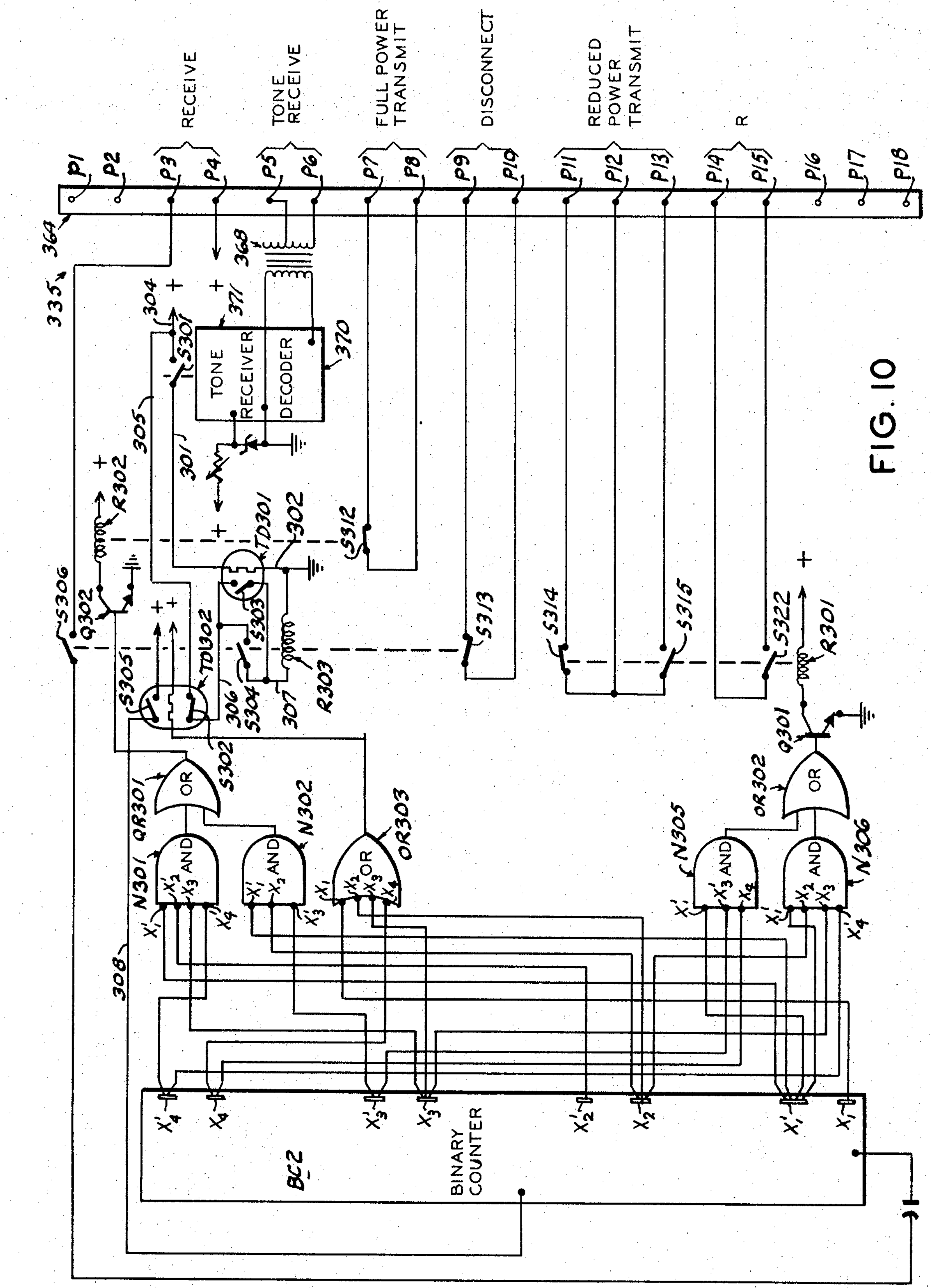

Referring also to FIG. 10, the numeral 335 illustrates a circuit which functions substantially identical to that shown by FIG. 4 and is used as terminal B' in a solid state carrier-current tester. This embodiment uses the similarly lettered and numbered junction strip 364 and a binary counter BC2. A plurality of AND gates N301, N302, N305 and N306, identical with the above named AND gates N1, N2, N5 and N6, have their respective lettered contacts connected with the like lettered terminals of the binary counter BC2. The outpout of the AND gates N301 and N302 are connected to the input of an OR gate OR301, identical to the above named OR gate OR1. The output of the OR gate OR301 is connected to the base of a transistor Q302. The emitter of the transistor Q302 is grounded and its collector is connected to the end of the coil of a relay R302 with the other end of the coil connected to the source of direct current. The output of the AND gates N305 and N306 are connected to the input of a second identical OR gate OR302 with its output connected to the base of a second transistor Q301 having its emitter grounded and its collector similarly connected to the coil of a relay R301 in turn connected to the source of direct current. A third identical OR gate OR 303 has its input connected with the respectively lettered terminals of the binary counter and its output connected to the resistance of a time delay TD302 with the other end of the time delay element connected with the source of direct current. A decoder 370 and tone receiver 371, identical to the decoder and tone receiver 170 and 171 of FIG. 4, are similarly connected together and to the primary winding of a transformer 368 similarly connected to the strip pins P5 and P6. The other terminals of the decoder and tone receiver are similarly connected to the source of direct current.

A relay, not shown, in the tone receiver 371, upon reception of tone from terminal A', closes a switch S301 connected by a wire 301 to the resistance of a time delay TD301 with the time delay in turn connected by a wire 302 to ground. The other terminal of switch S301 is connected by a wire 304 with the source of direct current. A wire 305 is connected, at one end, with the wire 304 and at its other end to one terminal of a normally open switch S302 controlled by the time delay TD302 with the other terminal of this switch connected by a wire 306 to one terminal of a switch S303 controlled by the time delay TD301. One end of the coil of a relay R303 is connected to the wire 302 with the other end of the coil connected to the wire 306, by a wire 307 through a switch S304 controlled by the relay R303. The other terminal of the switch S303 is connected to the wire 307. A wire 308 connects the binary counter BC2 to the source of direct current through a normally open switch S305 closed by the time delay TD302. Thus, when the tone receive relay 371 closes its switch S301, the time delay TD301 is energized to close its switch S303 which energizes relay R303 in turn closing its switch S304 to remain energized. Relay R303 also closes a switch S306 connected in series from the strip pin P3 to the binary counter BC2 in turn energizing the transistor controlled coils of relays R301 and R302. The full power transmit strip pins P7 and P8 are connected by a pair of wires through a relay R302 controlled switch S312. Similarly the disconnect strip pins P9 and P10 are connected through a relay R302 controlled switch S313. The reduced power transmit strip pins P11, P12 and P13 are interconnected by switches S314 and S315 for selective make or break operation, as disclosed hereinabove, for terminal B' and are controlled by relay R301. Similarly strip pins P14 and P15 are connected by a pair of wires through a relay R301 controlled switch S322.

Figure 11:
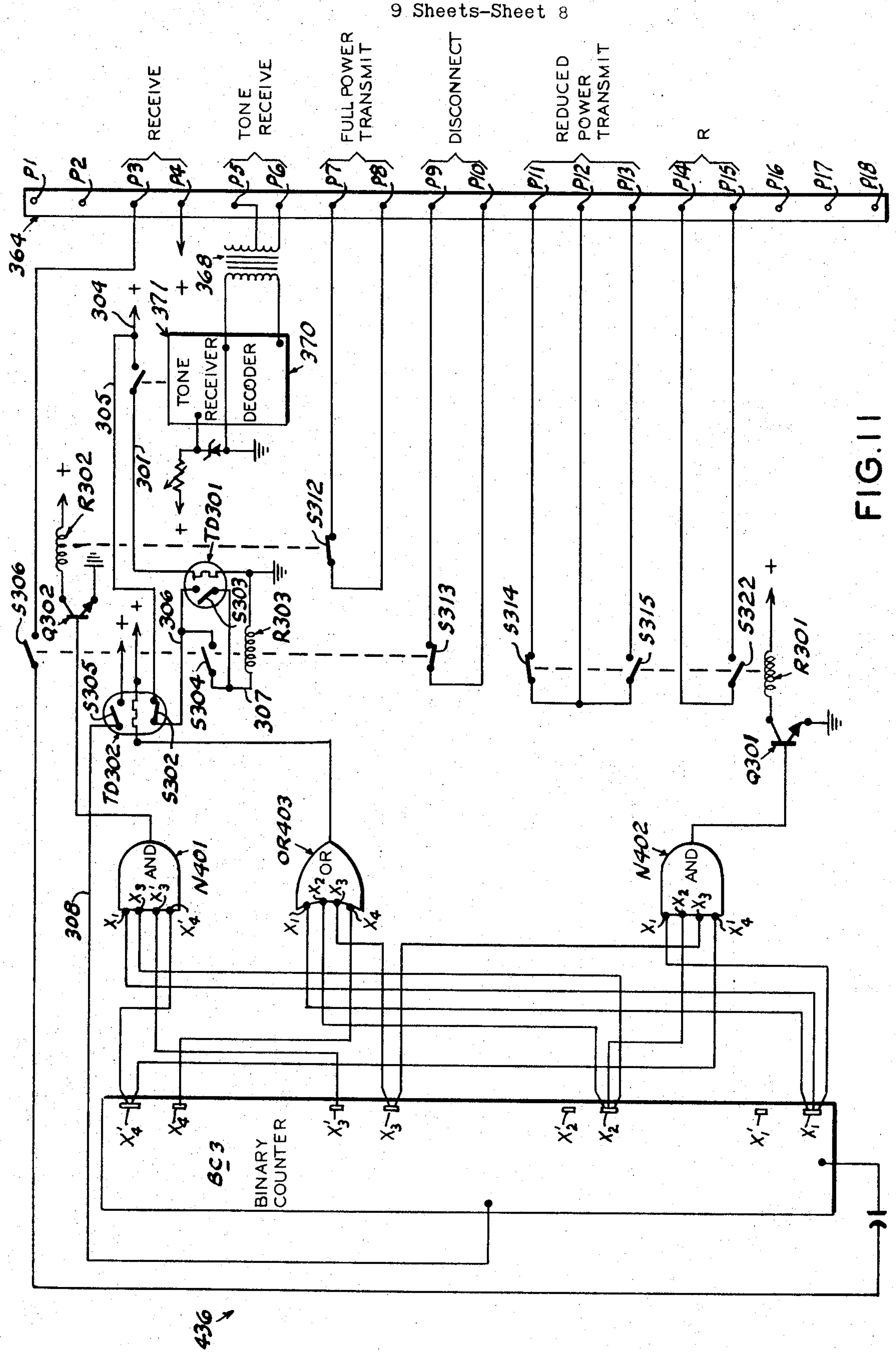
Figure 12:
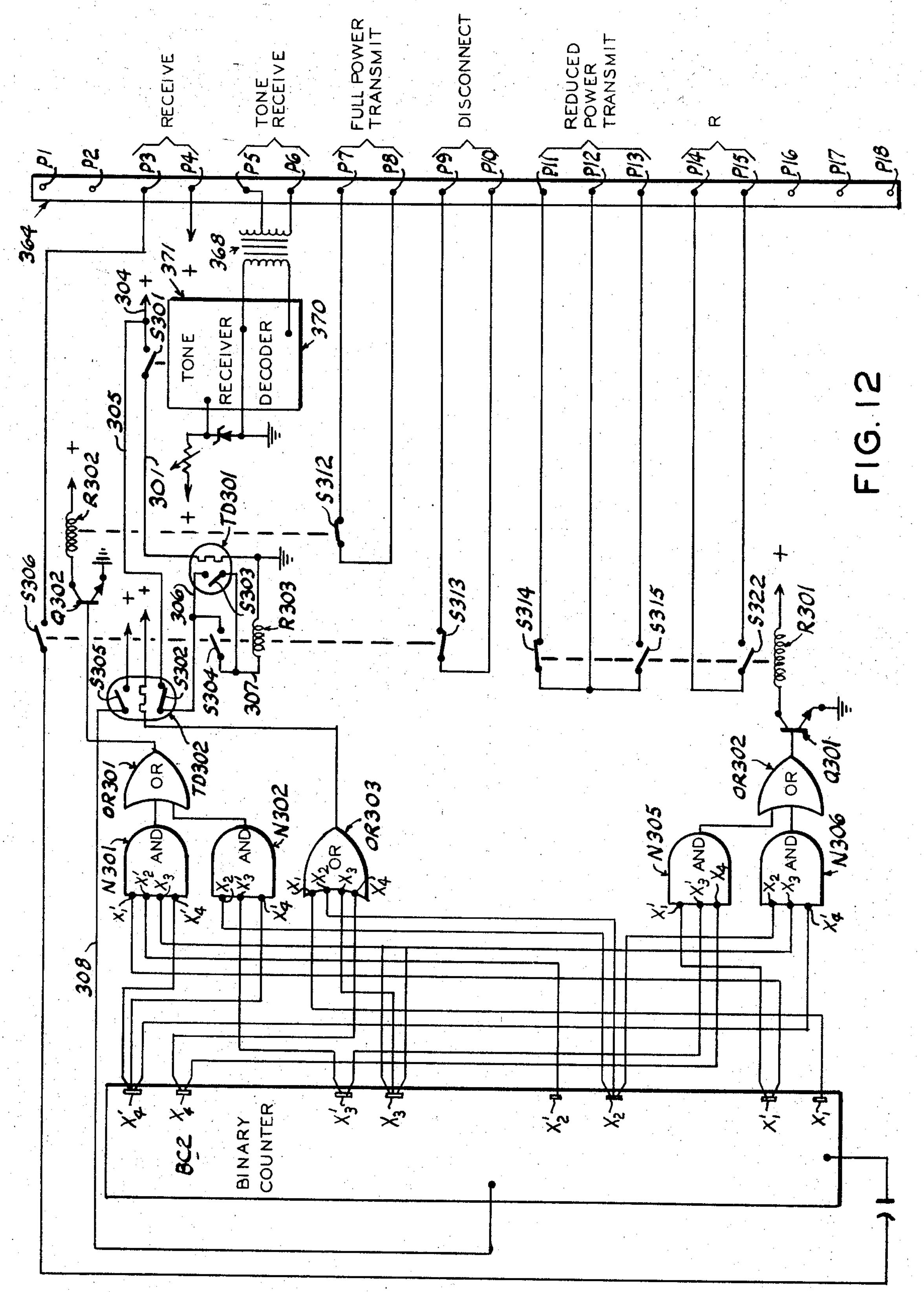

FIG. 11 illustrates a solid state tester or terminal C', indicated generally at 436, substantially identical to the circuit shown for terminal B' using similarly numbered components with the exception that only AND gates N401 and N402 are used and are respectively connected with the binary counter BC3. This embodiment similarly uses a single OR gate OR403. The output of the AND gate N401 is similarly connected to the transistor Q302 while the AND gate N402 is connected to the transistor Q301.

The circuit for solid state station or terminal D' (FIG. 12) is identical with the circuit shown for terminal B' (FIG. 10) and contains identical numbered and lettered components with the exception that AND gate N302 is connected with binary terminals $X_2$; $X_3'$ and $X_4'$ in place of those shown in the terminal B' diagram (FIG. 10). Further, AND gate N306 contains one less contact connected with the binary counter terminals obtained by eliminating the contact $X_1'$.

OPERATION

Terminal A is triggered into operation by the AC timer 72 which energizes the encoder 70 for the interval that relay R1 is closed by the time delay TD1. The encoder 70 modulates the station A transmitter and is received by strip pins P3 and P4 in terminal D in a two-station network or by terminals B and C in a three-station network. This encoder tone triggers the remote station or station D or B and C into operation by energizing the decoder 170 and tone receiver 171 to energize the time delay TD101 in terminal D or B and C. During this operation all terminals are stepped to the first digit or position one of the stepping relays.

The wiring of the stepping relays, in the electromechanical terminals, accomplishes the following sequence in a two-terminal network with transmit time determined by relay R4 in terminal A and relay R103 in terminal D:

| Step | Terminal | Operation |
|---|---|---|
| 1 | A | Transmits, D receives |
| 2 | D | Transmits, A receives |
| 3 | D | Transmits, A receives |
| 4 | D | Transmits, A receives |

At this point both terminals go to reduced power receive or reduced power transmit.

| Step | Terminal | Operation |
|---|---|---|
| 5 | A | Transmits, D receives |
| 6 | D | Transmits, A receives |
| 7 | D | Transmits, A receives |
| 8 | D | Transmits, A receives |
| 9 | D | Transmits, A receives |
| 10 | D | Transmits, A receives |

Upon completion terminal A registers a count on the counter CTR.

The wiring of the stepping relays accomplishes the following sequence in a three-terminal network with transmitter pulse time determined by relay R4 in terminal A and relay R103 in terminals B and C:

| Step | Terminal | Operation |
|---|---|---|
| 1 | A | Transmits, B and C receive |
| 2 | B | Transmits, A and C receive |
| 3 | C | Transmits, A and B receive |
| 4 | B | Transmits, A and C receive |

At this point all terminals go to reduced power receive or transmit.

| Step | Terminal | Operation |
|---|---|---|
| 5 | A | Transmits, B and C receive |
| 6 | B | Transmits, A and C receive |
| 7 | C | Transmits, A and B receive |
| 8 | B | Transmits, A and C receive |
| 9 | A | Transmits, B and C receive |
| 10 | C | Transmits, A and B receive |

Transmission of full power is accomplished by relay R5 in terminal A and relay R104 in terminals B, C and D. Full power transmit contacts are pins P1 and P2 for terminal A and pins P7 and P8 on the junction strip for terminals B, C and D. These strip terminals or pins are connected to the carrier transmitter. Reduced power transmit is accomplished by relay R1 for terminal A and relay R105 for terminals B, C and D. Pins P13 and P14 in terminal A are used for reduced power transmit. Pins P11, P12 and P13 are used in terminals B, C and D with a choice of normally open or normally closed contacts S114 or S115, respectively, available. For reduced power receive units pins P17 and P18 in terminal A and pins P14 and P15 in terminals B, C and D are used instead of the pins devoted to reduced power transmit. Terminal A uses pins P7 and P8 for urgent or major alarm and pins P9 and P10 are used for minor alarm.

If the sequence fails in steps one through four, time delay TD1 of terminal A will initiate an urgent alarm, and in steps five to 10, time delay TD4 a minor alarm. Time delay TD4 will recycle the terminals B, C and D to normal upon failure to complete the cycle. Terminal A can be recycled by pushing the reset button S9.

The solid state versions terminals A', B',C' and D' (FIGS. 9, 10, 11 and 12) are basically the same except instead of a stepping relay a binary counter ($X_1$; $X_2$; $X_3$ and $X_4$) is used to digitalize the transmission and reception. When each terminal transmits or receives is determined the logic circuitry which is fed by the output of the binary counter.

Obviously the invention is susceptible to changes or alterations without defeating its practicability, therefore, I do not wish to be confined to the preferred embodiment shown in drawings and described herein.

I claim:

1. Automatic relay carrier testing apparatus for high voltage transmission lines having protective relay means including a carrier-current transmitter and receiver interconnected between spaced transmission line stations, comprising:

control circuit means connected to energize the transmitter at one said station;

second circuit means connected to energize the transmitter at a remote said station;

first control actuating means comprising timer means including a timer circuit having a normally open timer switch closed at predetermined times for energizing said control circuit means;

a code signal generating circuit energized by said timer circuit;

second actuating means for energizing said second circuit means in response to energization of said control circuit means;

control program switch means providing a plurality of control signals at said one station; and, second program switch means synchronized with said control program switch means and providing a second plurality of control signals at said remote station, whereby said control program switch means and said second program switch means energize their respective transmitters in a predetermined order to verify the operation of the carrier-current equipment.

2. The automatic relay carrier testing apparatus according to claim 1 in which said second actuating means includes:

a code signal receiving circuit for actuting a code signal switch and energizing said second circuit means.

3. The automatic relay carrier testing apparatus according to claim 2 which further includes:

means including an alarm circuit in said second circuit means for detecting a fault in the programed switching test and actuating an alarm at said one station.

4. The automatic relay carrier testing apparatus according to claim 3 and further including:

a carrier send circuit in said control circuit means and said second circuit means to enable carrier transmission at said one station and said remote station in response to the operation of the respective program switch means; and, a carrier receive circuit in said control circuit means and said second circuit means to indicate carrier reception at said one station and said remote station in response to the operation of the respective program switch means and in sequence with carrier send transmission.

5. The automatic relay carrier testing apparatus according to claim 4 and further including:

means including a time delay relay in said second circuit means for automatically recycling said second circuit means to a starting position upon failure of said second circuit means to complete a programed test.

6. The automatic relay carrier testing apparatus according to claim 5 in which said control program switch means includes:

a control stepping relay having a plurality of interconnected contacts denoting a primary test and having a second plurality of interconnected contacts denoting a secondary test.

7. The automatic relay carrier testing apparatus according to claim 6 in which said second program switch means includes:

a second stepping relay responsive to the operation of said control stepping relay.

8. The automatic relay carrier testing apparatus according to claim 5 in which said control program switch means and said second program switch means each includes:

binary counting means.

* * * * *